United States Patent [19]

Holmes

[11] 4,397,805
[45] Aug. 9, 1983

[54] METHOD FOR MAKING A VIDEO DISC

[75] Inventor: John R. Holmes, Garden Grove, Calif.

[73] Assignee: Discovision Associates, Costa Mesa, Calif.

[21] Appl. No.: 317,975

[22] Filed: Nov. 3, 1981

Related U.S. Application Data

[63] Continuation of Ser. No. 31,206, Apr. 18, 1979, abandoned, which is a continuation of Ser. No. 937,221, Aug. 28, 1978, abandoned.

[51] Int. Cl.³ .................................................. B29D 17/00
[52] U.S. Cl. ........................... 264/328.14; 264/107; 264/328.17; 425/810
[58] Field of Search ............ 264/106, 107, 328.1, 264/328.14, 328.17; 425/810

[56] References Cited

U.S. PATENT DOCUMENTS 1,997,572  4/1935  Bren .................................. 523/174 X
4,176,104  11/1979  Alsburg ........................ 264/328.1 X
4,185,955  1/1980  Holmes ............................ 264/106 X

OTHER PUBLICATIONS

"A More Heat-Resistant Acrylate Material," *British Plastics*, Oct. 1943, pp. 254-257.

*Primary Examiner*—Thomas P. Pavelko

[57] ABSTRACT

A video disc member is described having a uniform value of birefringence over the entire information storage surface of the disc. This value of birefringence is the same at the inner information storage radius as at the outer information storage radius. The preferable composition of the video disc is a specially prepared polymethylmethacrylate, referred to as PMMA. The method of molding the improved video disc member includes an extended drying time for said composition and increasing the melting temperature. The increase in melt temperature provides a low and uniform value of birefringence. The improved drying cycle eliminates splay marks, blisters and other surface imperfections as compared to manufacturer recommended drying times.

13 Claims, 8 Drawing Figures

METHOD FOR MAKING A VIDEO DISC

CROSS-REFERENCE TO RELATED APPLICATION

This application is a continuation of application Ser. No. 31,206, filed Apr. 18, 1979 now abandoned which was a continuance in-part of application Ser. No. 937,221, filed on Aug. 28, 1978, now abandoned and entitled "Video Disc Composition and Method for Molding".

BACKGROUND OF THE INVENTION

1. Field of the Invention

The present invention relates to an optically clear, plastic member useful as a video disc structure, a composition of material for use in making such optically clear, plastic member, and a method for molding a video disc member from this composition of material, and more particularly, to a video disc structure having increased structural flexibility, improved resistance to breakage and a minimum and uniform value of birefringence extending across the entire surface of the disc.

An object of the present invention is to provide an optically clear, plastic member useful as a protective, transmissive layer for an impinging light beam.

Another object of the present invention is to provide a video disc structure having a uniform value of birefringence extending across the entire surface of the video disc member.

A further object of the present invention is to provide a video disc structure being improved flexibility and resistance both to breakage and the formation of internal stress lines due to expected handling.

2. Description of the Prior Art

U.S. Pat. No. 4,124,672 to Manfred H. Jarsen, entitled "Replication Utilizing A Casting Process", describes a video disc member which includes a body member including integrally formed information indicia, a reflective coating covering the information indicia, and a protective coating formed over the reflective layer.

The information indicia are further described as light reflective and light non-reflective elements positioned sequentially in track-like fashion on a surface of the video disc member. The light reflective and light non-reflective elements are arranged to represent the frequency modulated signal. The frequency band width extends from 0.25 Mz to 10 Mz. In the preferred embodiment, such a video disc member is employed for storing a frequency modulated signal representing a composite video signal. The composite video signal contains both a chrominance signal in combination with the luminance signal.

In one mode of operation of such a video disc, the read beam passed through the protective layer and is modulated by the information indicia. The reflective layer enhances both the light reflectivity of the light reflective regions and the light scattering of the light non-reflective regions.

In an alternate mode of operation, the read beam impinges upon the undersurface of the video disc substrate member and passes through the substrate body. After passing through the substrate body, the read beam impinges upon the information indicia and is modulated by the information indicia carried thereon. In this second mode of operation, the reflective layer also enhances the reflection from the light reflective regions and also enhances the scattering from the light non-reflective regions.

In such a video disc structure, a number of areas of improvement are herein identified for improving the quality of a video picture recovered from the video disc and displayed upon a standard television receiver.

A first such area of improvement is related to improving the radial error tracking signal by providing improved clarity and birefringence in the thick video disc body through which the reading beam passes prior to impinging upon the information indicia carried thereby. Typical video disc members have a thickness falling within the range of 0.101 MM to 2.5 MM. The birefringence of such a substrate body is measured in nanometers. A nanometer is a measure of the optical retardation and distortion of light as it passes through a transparent body.

By following the manufacturers suggested molding time of a two second injection cycle at a suggested temperature of about 480° F. video disc members were formed having commercially non-acceptable characteristics. The video disc members were not flat but rather were umbrella shaped in cross-section. This umbrella shape is measured at the center of the disc by measuring the distance the center of the disc is spaced from a plane passing through at least two points on the outer periphery of the disc. This distance is identified as the crown of the disc. In the example given above, this crown is 10 MM.

A further non-acceptable characteristic is the lack of uniform values of birefringence exhibited by the information storage area of such a video disc. Values of birefringence ranging from a low of four nanometers to a high of one hundred nanometers were measured. A substantially uniform value of birefringence of plus or minus five nanometers over the entire information storage area is preferred.

Such a prior art disc is brittle and subject to easy surface scratching and the generation of internal stress lines which result in surface cracks.

A final non-acceptable characteristic for a video disc member is the presence of splay marks, blisters and other surface imperfections. All of these characteristics affect the quality of the modulated light beam recovered after reflection from the video disc surface.

SUMMARY OF THE INVENTION

The preferred video disc structure is made of a single piece of transparent plastic made by injection molding. The video disc structure includes an information bearing surface having light reflective and light non-reflective regions arranged sequentially in alternate positions in track-like fashion. While the entire body is transparent, the light reflective and light non-reflective regions are formed during the injection molding process. A light reflective region is planar in shape while a light non-reflective region is a region which extends above or below the planar region. In a preferred embodiment, the light non-reflective region is of bump-shaped configuration. All of the tops lie in a common plane displaced from the planar region comprising the light reflective regions. In a further embodiment, the information bearing surface of a video disc member comprises sequentially positioned planar-shaped members positioned in alternate planes. Due to the speed of rotation of the video disc member and the maximum resolving power of the objective lens used to gather the reflected light from each of the planar regions, the discontinuities between such planar regions act to identify reflective and light non-reflective regions in the same manner as in the preferred embodiment.

In the preferred embodiment, the light reflectivity and light non-reflectivity is achieved by the application of a reflective layer over the light reflective and light non-reflective regions. A protective layer is then formed over the reflective layer. The impinging light beam passes from the underside of the video disc member through the injected molded body and is modulated by the light reflective and light non-reflective regions.

In a rigid video disc member, the thickness of the substrate body falls within a preferred range of 0.101 MM to 2.5 MM. This means that the impinging beam must pass through the thickness of substrate essentially unchanged in intensity, directivity and focus prior to impinging upon the light reflective and light non-reflective members. The read beam is intensity modulated by the act of impinging upon the light reflective and light non-reflective members. The modulated read beam is reflected by the reflective layer back through the video disc substrate body. Preferrably, the first and second passages of the light beam and modulated reflected beam, respectively, through the video disc body do not change the intensity, directivity and focus of the read light beam nor the intensity, directivity and freedom from noise in the reflected, modulated beam.

In practice, the impinging light beam and the reflected modulated light beam are affected by the composition of the video disc substrate body. The imperfections in the video disc substrate body introduce noise signals into the reflected modulated read beam. These distortions appear as noise on the reflected signal and degrade the picture quality as displayed on a standard television receiver.

The preferred composition for the plastic video disc structure comprises a specially prepared polymethylmethacrylate, hereinafter referred to as "PMMA".

Pelletized PMMA material is given an extended drying step for removing all removable traces of water. The dried material is removed from the drying chamber immediately before use in the injection molding process. The injection molding temperature is raised to a maximum of about 560° F. Improved results were noted when the injection molding temperature was selected from a range of about 510° F. to about 560° F., and the duration of the injection molding cycle was set within a range of 0.5 to 1.5 seconds.

BRIEF DESCRIPTION OF THE FIGURES

FIG. 1a is a block diagram of a prior art video disc player showing the relationship of the video disc with the remainder of the electronics used in the player;

FIG. 1b shows a greatly enlarged, schematic view of a portion of the video disc shown in FIG. 1a;

FIG. 2 is a partial sectional and perspective view of a video disc structure shown in FIG. 1a;

Figure 1:
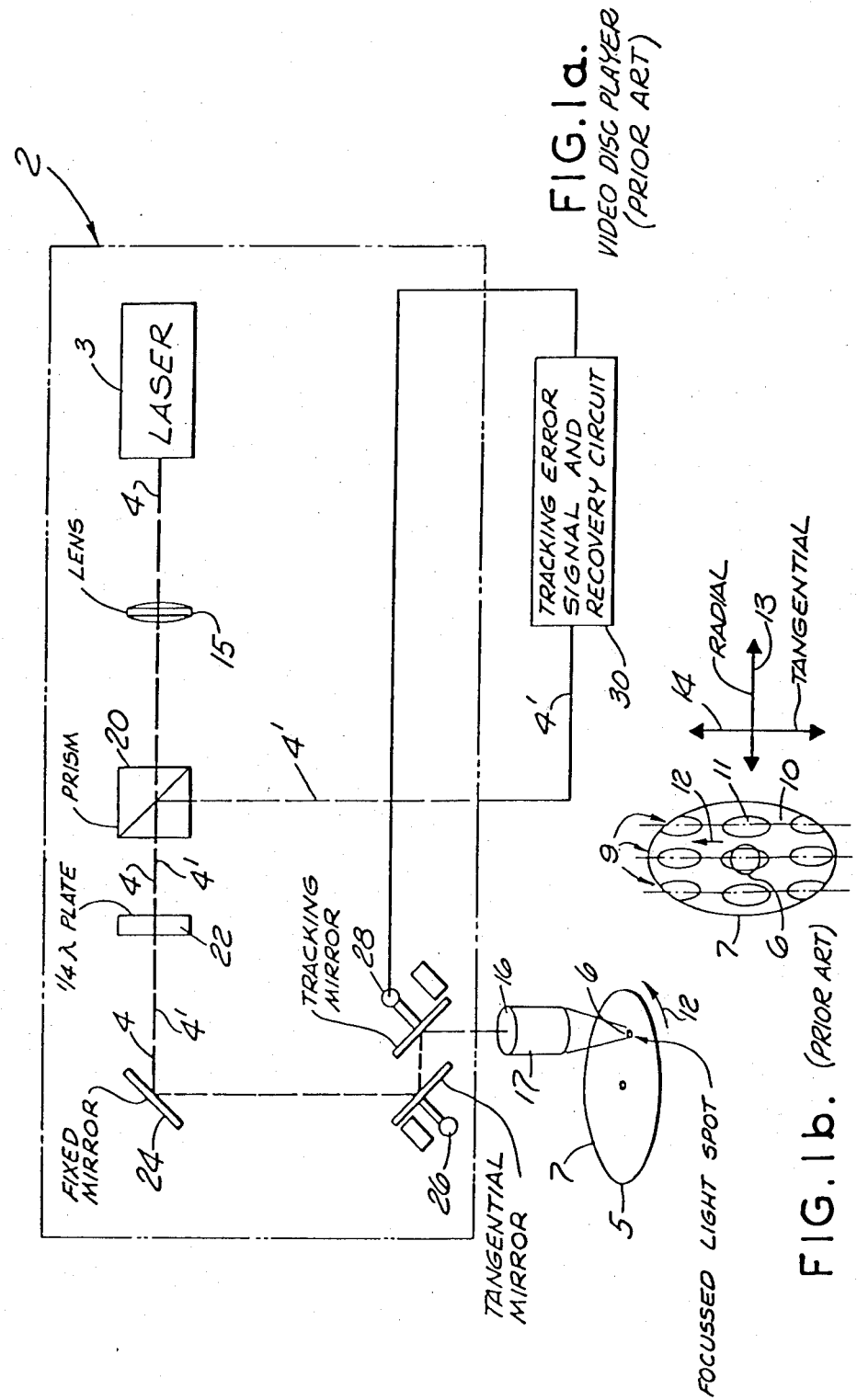
Figure 6:
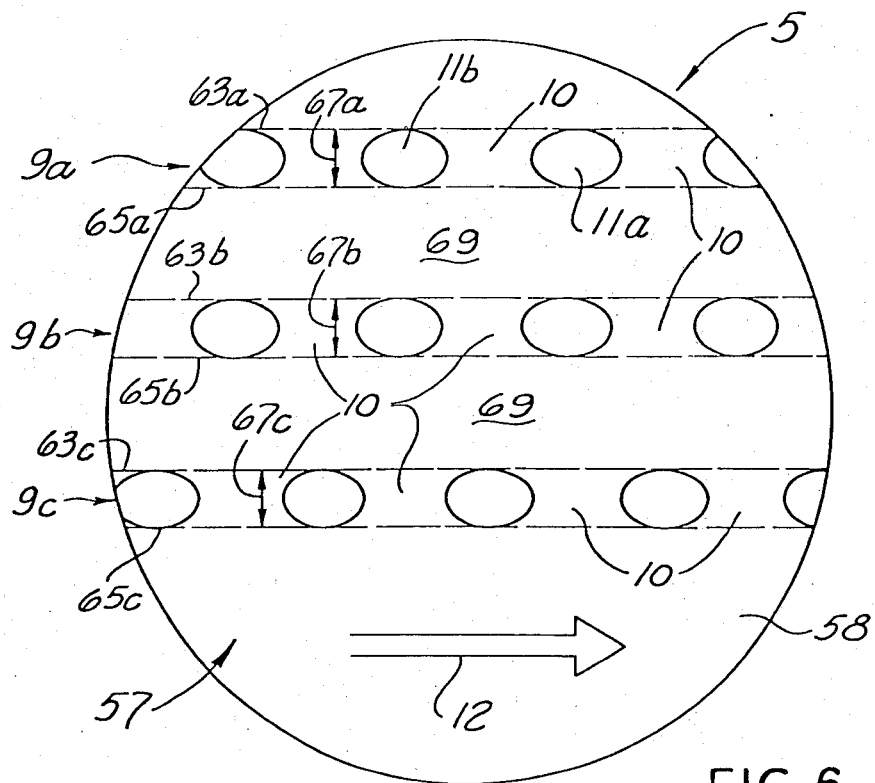
Figure 7:
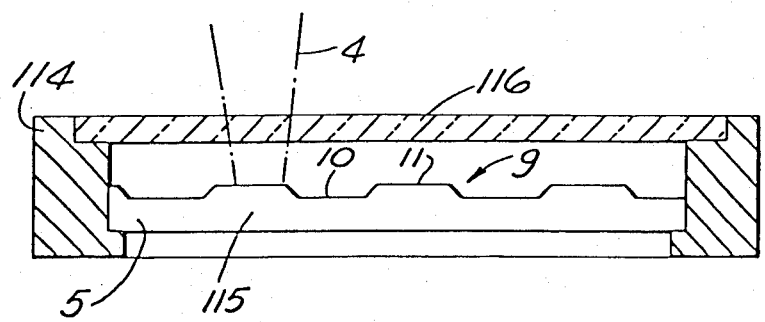

FFIG. 5 is a radial cross-sectional view illustrating a third embodiment of such a video disc structure;

FIG. 6 is an enlarged view of a portion of surface of the video disc member shown in FIG. 1; and FIG. 7 is a cross-sectional view of a record being read through an optically clear view member made according to the teaching of this invention.

DETAILED DESCRIPTION OF THE PREFERRED EMBODIMENT

The same numeral is used in the several views to represent the same element.

Referring to FIG. 1a, there is shown a schematic block diagram of an optical system 2 employed in a typical prior art video disc player system. The optical system 2 includes a read laser 3 employed for generating a read beam 4 which is used for reading a frequency modulated encoded signal stored on a video disc 5. The read beam 4 is polarized in a predetermined direction. The read beam 3 is directed to the video disc 5 by the optical system 2. An additional function of the optical system 2 is to image the light beam to a spot 6 at its point of impingement with the video disc 5.

An enlarged view of a portion of an information bearing surface 7 of the video disc 5 is shown in FIG. 1b. Each of a plurality of information tracks is generally indicated by a line 9 which is drawn through a plurality of successively positioned light reflective members 10 and light non-reflective members 11. The detailed description of these members 10 and 11 are given hereinafter. The clockwise direction of rotation of the disc 5 under the stationary read beam 4 is indicated by the head on an arrow 12. The read beam 4 has two degrees of movement, the first of which is in the radial direction as indicated by a double headed arrow 13. The second of which is the tangential direction as indicated by a double headed arrow 14. The double heads of each of the arrows 13 and 14 indicate that the read beam 4 can move in both directions in each of the radial directions and the tangential direction.

The optical system 2 further comprises a lens 15 employed for shaping the beam 4 to fully fill an entrance aperture 16 of a microscopic objective lens 17. The objective lens is employed for forming the spot 6 of light at its point of impingement with the regions 10 and 11 of the information track 9. Improved results have been found when the entrance aperture 16 is overfilled by the reading beam 4. This results in maximum light intensity at the spot 6.

After the beam 4 is properly formed by the lens 15, it passes through a beam splitting prism 20. The transmitted portion of the beam 4 is applied through a quarter-wave plate 22 which provides a forty-five degree shift in polarization of the incident light forming the beam 4. The read beam 4 next impinges upon a fixed mirror 24 which redirects the read beam 4 to a first articulated mirror 26. The function of the first articulated mirror 26 is to move the light beam in a first degree of motion which is tangential to the surface 7 of the video discs 5 to correct for time base errors introduced into the reading beam 4 because of eccentricities in the manufacture of the disc 5. The tangential direction is in the forward and/or backward direction along the information track 9 on the video disc 5 as indicated by the double headed arrow 14.

The first articulated mirror 26 directs the light beam to a second articulated mirror 28. The second articulated mirror 28 is employed as a radial tracking mirror. It is the function of the tracking mirror 28 to respond to a composite tracking error signal by slightly changing its physical position with relation to the read beam 4 to control the point of impingement 6 of the read beam 4 for radially tracking the information carrying members 10 and 11 along a single information track 9. The second articulated mirror 28 has one degree of movement which moves the light beam in a radial direction over the surface of the disc 5 in the direction indicated by the double headed arrow 13. The read beam 4 now impinges upon the entrance aperture 16, as previously described, and is focused to a spot 6 upon the information track 9 of the video disc 5 by the lens 17.

In the normal playing mode, the focused beam of light impinges upon successively positioned light reflective regions 10 and light non-reflective members 11 representing the frequency modulated information. In the preferred embodiment, the light non-reflective members 11 are light scattering elements carried by the video disc 5. The reflected beam 4' is a modulated light beam and the reflected beam is identified at 4'. The modulated reflected beam 4' is a light equivalent of the frequency modulated signal represented by the light reflective and light non-reflective members 10 and 11 positioned in the track 9. This modulated light beam is gathered by the microscopic objective lens 17 as it is reflected from the successively positioned light reflective members 10 and light non-reflective members 11 on the video disc 5. The reflected read beam 4' retraces a portion of the same path previously described for the impinging read beam 4. This path includes sequential reflection from the second articulated mirror 28, the first articulated mirror 26, and the fixed mirror 24. This common path in the read optical system 2 is identified by using both the numeral 4 for the incident light beam and the numeral 4' for the reflected beam. The reflected read beam 4' next passes through the quarterwave plate 22. The quarterwave plate 22 provides an additional forty-five degree polarization shift resulting in a total of ninety degree shift in polarization of the reflected read beam 4' with respect to the incident read beam 4. The reflected read beam 4' now impinges upon the beam splitting prism 20, which prism diverts the ninety degree phase shifted reflected read beam 4' to impinge upon a tracking error signal recovery circuit indicated generally at 30. The circuit 30 generates the radial tracking error signal identified hereinafter.

Figure 2:
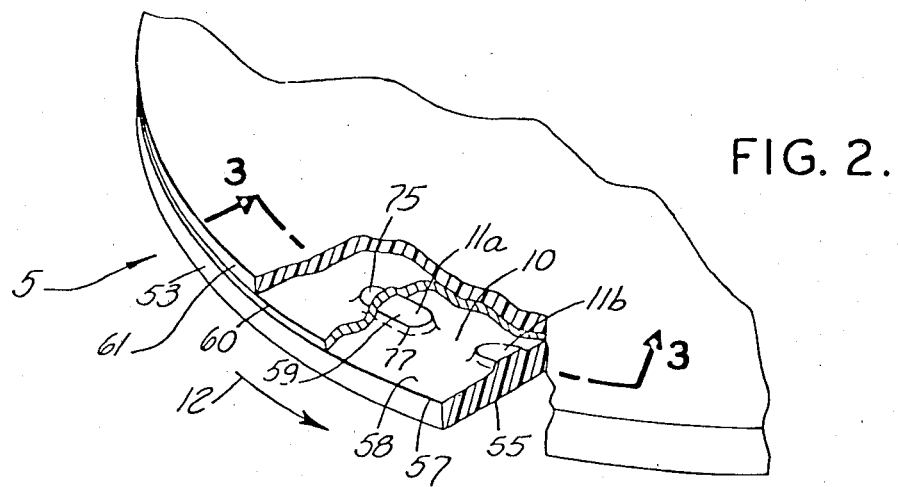

Referring to FIG. 2, there is shown a partial sectional and perspective view of a video disc member 5. The video disc 5 includes a substrate member 53 having a first or entrance surface at 55 and a second or information bearing surface 57. The upper surface 57 includes a planar-shaped surface portion 58 which includes segments 10 which function as the light reflective portion of an information track 9. The upper surface 57 further includes non-planar surface regions 59 which function as the light scattering members 11 of an information track. Each of the light reflective segments 10 is positioned between a pair of light scattering regions such as 11a and 11b.

A highly reflective layer 60 is formed over the surface 57 and a protective coating 61 is formed over the highly reflective layer 60.

Referring to FIG. 7, there is shown a schematic view of a portion of the information bearing surface 57, including a plurality of tracks 9a, 9b and 9c. Each of the information tracks is a ring-shaped area lying between pairs of construction lines 63 and 65. Track 9a is generally lying between pairs of construction lines 63a and 65a, track 9b is generally lying between construction lines 63b and 65b, and track 9c is generally lying between construction lines 63c and 65c.

The width of each of the ring-shaped areas 9a, 9b and 9c is in the radial direction and this width dimension is indicated by the length of a line 67a, 67b and 67c, respectively. The length of the ring-shaped areas 9a, 9b, and 9c is in the circumferential direction and varies according to the radius of the ring-shaped member according to the well known formula $2\pi R$.

The planar-shaped portion 58 of the information storage surface 57 further includes planar-shaped intertrack guard regions 69 for separating adjacent tracks such as 9a and 9b. In this top view of an information track such as 9a, the planar reflective regions are shown as 10 and the scattering regions are shown as 11. In the embodiment shown in FIGS. 2 and 3, the light scattering regions 11 are shown as trapezoidal in cross-section having a leading edge 71 and a trailing edge 73, and a planar-shaped upper surface in the form of an oval. As shown in FIG. 2, the light scattering regions 11 having the trapezoidal cross-section is shown as a frustum of an oval cone, having its surface 59 including an oval-shaped upper surface 75 and a side surface 77.

Figure 3:
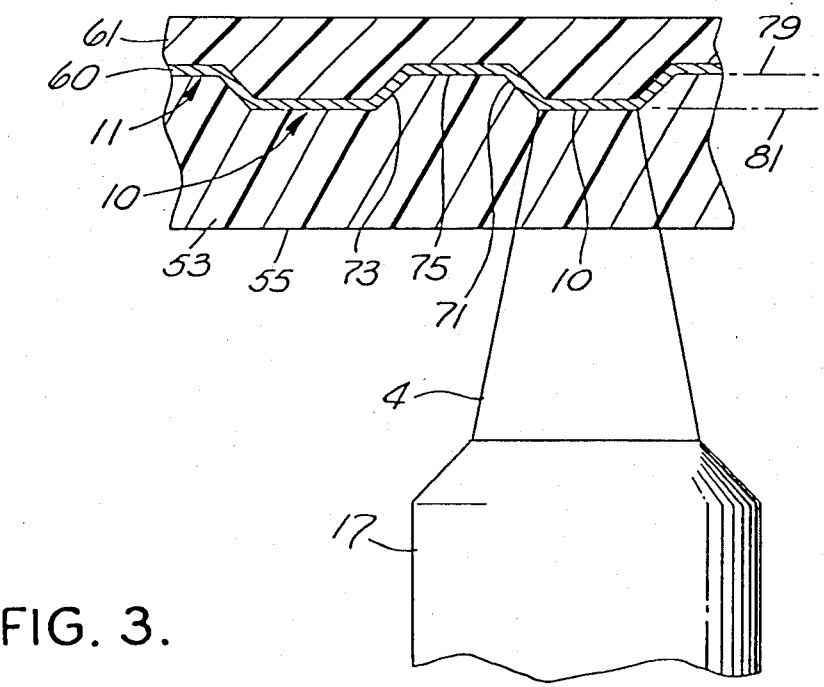
FIG. 3 shows a radial cross-sectional view taken along the line 3—3 of the video disc shown in FIG. 2 and includes a side elevational view of the objective lens shown in FIG. 1.

Referring to FIG. 3 alone, the upper surfaces 75 of all light scattering members 11 are shown terminated in a single plane indicated by a line 79. All light reflective regions 10 are shown terminated in a single plane indicated by a line 81. The highly reflective layer 60 is covered with the protective layer 61. By observation it can be noted that the protective layer 61 is substantially thinner than the substrate body 53. The objective lens, shown in side elevation, images the read beam 4 upon a light reflective region 10.

Figure 4:
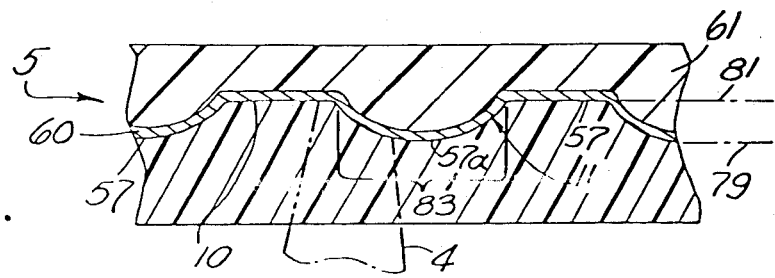
FIG. 4 is a radial cross-sectional view illustrating a second embodiment of such a video disc structure.

Referring to FIG. 4, there is shown a substantially identical cross-sectional view of a video disc structure 5 except that the light scattering region 11 is shown as a depression from the surface 57 and is represented as a semicircular line 57a lying between the bracket 83. In a perspective view (not shown), the depression is seen as a hemisphere-shaped void in the surface 57. The read beam 4 is shown imaged in part upon a light reflective region 10 and a light scattering region 11.

Figure 5:
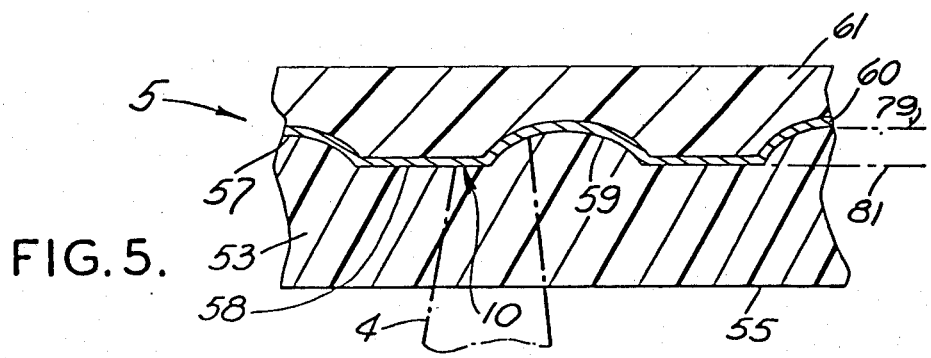

Referring to FIG. 5, there is shown a third embodiment of a video disc structure 5 suitable for use in the video disc player shown in FIG. 1. The substrate is shown at 53 having a first or entrance surface at 55 and a second or information bearing surface 57. The planar light reflective regions 10 are shown at 58. The light scattering regions 11 are shown as curved-shaped surface regions 59. The reflective layer 60 is formed over the upper surface 57. A protective layer 61 is shown formed over the reflective layer 60. The objective lens images the read beam 4 partially upon a planar-shaped light reflective portion 58 of the information bearing surface 57 and partially upon the curved-shaped portion 59 of the information bearing surface 57.

EXAMPLE NUMBER 1

A video disc structure is formed using PMMA without any special preparation as the molding material. The injection molding machine is of the type described in U.S. Pat. No. 4,185,955 to John R. Holmes et al, entitled "Apparatus for Replicating Centrally Apertured Video Disc Records". The molding temperature of the injection molding cycle is set at 480° F. and the injection time is two seconds. The first molding temperature is set at that temperature recommended by the manufacturer of the injection molding material.

The injection molded video disc structure manufactured in this manner was inspected and found to be of substantially umbrella form having a raised crown of approximately ten millimeters. The measured values of birefringence ranged from a minimum of four nanometers at the outer radius to a maximum of one hundred nanometers at the center of the disc. The video disc structure was found to be very brittle with a number of surface marks. It broke when bent to a three and one-half inch radius.

Example Numbers 2 to 5, hereinafter, were prepared using the injection molding machine described in Example Number 1, and using PMMA without any special preparation.

EXAMPLE NUMBER 2

A mixture of all PMMA was used in the injection molding machine. The temperature of the melt was raised to 508° F. and the injection time held at two seconds. The video disc structure made during this injection molding cycle was found to have a five millimeter crown. The disc exhibited varying values of birefringence beginning at a low value of four nanometers at the outer radius and rising to a maximum of fifty nanometers at the center of the disc. The disc was brittle and carried a plurality of surface marks. This test showed that an increase in melt temperature resulted in a reduction of absolute values of birefringence. An increase in temperature above that recommended by the manufacturer also resulted in an increase in surface imperfections.

EXAMPLE NUMBER 3

The composition for the injection molding cycle was kept at all PMMA. The temperature of the melt was raised to 536° F. and the injection time was held at two seconds. A video disc structure made according to this procedure was found to be nearly flat having a two millimeter crown. The value of birefringence was found to begin with a minimum of four nanometers at the outer radius and increased to a maximum of thirty nanometers at the center of the disc. The video disc remained brittle with an increasing number of surface marks when compared to the disc made according to the process explained with reference to Example Number 2.

EXAMPLE NUMBER 4

The compositon of the injection melt was one hundred percent PMMA. The temperature of the melt was kept at 536° F. while the injection time was reduced to one second. This resulted in a substantially flat video disc structure having a zero millimeter crown. The value of birefringence were measured at a low of four nanometers at the circumferential edge of the disc to 15 nanometers at the central part of the disc. The video disc structure remains brittle with additional surface marks when compared with the surface marks found in the video disc structure made according to Example Number 3.

This test showed that a reduced injection time is possible because of the high temperature of the injection melt. This high temperature provides reduced resistance to the flow of the melt into the molding cavity.

This test also showed that higher temperatures of the injection melt and reduced injection time increased brittleness and resulted in increased surface imperfections.

EXAMPLE NUMBER 5

The composition of the injection melt is one hundred percent PMMA. The temperature is maintained at 536° F. and the injection time is reduced to 0.5 seconds. The video disc structure made according to this procedure is found to be substantially flat having a zero millimeter crown. The value of birefringence continued to drop to a gradient of 4–10 nanometers from the outer radius to the inner radius, respectively. The disc characteristics show continued increase in brittleness and increased surface marks are found when compared to the disc structure made according to the procedure set forth in Example Number 4.

It has been found that the drawbacks of brittleness and surface marking present in the disc of Example Number 5 can be eliminated by using a PMMA acrylic that has been specially prepared to provide a melt-flow rate, particle count, size stability, a monomer free system and lubrication system as described hereinafter.

Melt-Flow Rate

The PMMA is processed to have a melt-flow rate of about 20 to about 23 grams per ten minutes as measured by ASTM number D 1238 condition I. At lower melt-flow rates, the polymer is more viscous and requires an increase in pressure to force the polymer to flow into the mold. The increased pressure results in a difference in density of the polymer in the disc which results in warping of the disc into an umbrella shape after release from the mold. At the desired melt-flow rate as aforesaid, the density of the polymer in the disc is substantially uniform with a result that after release from the mold, the disc will not warp and has a relatively low and uniform birefringence.

At melt-flow rates which are higher than the desired rate, the environmental properties of the plastic disc member are unacceptable, e.g., the plastic is too brittle and melts at relatively low temperatures, and has relatively low hardness, rigidity, and tensile strength.

If the desired melt-flow rate causes any undue brittleness in the disc, such brittleness can be minimized by making the disc thicker. The disc can be made thicker by either making the mold thicker or by fabricating two discs into one disc.

Particle Size

Foreign particles in PMMA will cause light beams to deflect when passing through the disc and should be eliminated. This can be accomplished by not adding ultra-violet absorbers, toners, or other foreign particles to the polymer during its manufacture, or by filtering the polymer so that the size of the particles in the PMMA are not more than 1 to 10 microns.

Monomers and Stability

The presence of monomers in the polymer is to be eliminated because such monomers cause blistering of the disc during molding and blistering of the aluminium reflective coat after vacuum metalizing. Monomers may also be produced during molding if the polymer breaks down. Accordingly, the polymer should be stable and not subject to degradation under the processing or molding conditions described herein.

Lubrication

A suitable lubricant is admixed with PMMA to permit the disc structure to be easily removed from the mold. The lubricant should be selected to have a vapor pressure below the molding temperature to avoid loss of the lubricant which would otherwise splash on and blemish the surface of the disc when the mold is open. Examples of suitable lubricants as aforesaid are: Stearyl alcohol, stearic acid, metal stearates, such as zinc or calcium stearate, crystalline paraffin waxes, and Montan waxes.

The lubricant should be used in the amount of about 0.5% to about 0.8% by weight of plastic to allow for ease of release from the mold and sufficient adhesion between the plastic disc and the vacuum deposited aluminum.

The specially prepared PMMA as described hereinabove was injection molded using an injection molding machine described in my copending application entitled "Molding Apparatus for Producing Centrally Apertured Record Discs", Ser. No. 031,205, filed on the same date as the present application. The PMMA is given an extended drying time of 24 to 48 hours prior to use in the injection molding machine. The melt temperature is 560° F. and the injection time is 0.5 second.

Referring to FIG. 8, there is shown a sectional view of an optically readable member 5 having a single information track 9 shown in cross-section. The information track 9 comprises light reflective regions 10 and light scattering regions 11. The member 112 is mechanically joined with a spaced member 114 which also mechanically holds an optically clear view member 116 which is made pursuant to the teachings of the present invention. A reading beam 4 is shown imaged upon a light scattering member 11. In this embodiment, the optically clear member 116 operates a dust cover of general protective sheet member to protect the member 5 from the environment. It is essential that the optically clear member 116, shown as being of uniform thickness over its entire length, is of such composition as to not interfere with the intensity-directivity and/or focus of the read beam 4. In this embodiment, the reading of the video disc member 5 is achieved by placing the optically clear member 116 intermediate the source of the read beam 4 and the video disc member 5 and imaging the read beam 4 upon the information track 9.

While presently preferred embodiments have been described in detail, it should be appreciated that the invention is not to be limited except by the claims.

What is claimed is:

1. A method for forming an optically readable information bearing structure, comprising the steps of:
   processing a clear polymethylmethacrylate plastic to a melt flow rate of about 20 to about 23 grams per 10 minutes;
   heating the plastic to a temperature falling within the range of 510° F. to 560° F.; and
   using said heated plastic in an injection molding cycle.

2. A method as recited in claim 1 wherein the plastic contains substantially no foreign particles.

3. A method as recited in claim 1 wherein the plastic contains foreign particles with a size range between about 1 micron and about 10 microns.

4. A method as recited in claim 1 wherein the plastic contains from about 0.5% to about 0.8% by weight lubricant, and wherein the lubricant has a vaporization temperature above the heating temperature.

5. A method as recited in claim 1 and further comprising the step of:
   thoroughly drying said plastic prior to said heating step.

6. A method as recited in claim 5 wherein the plastic is dried for about 24 hours to about 48 hours.

7. A process for making an optically readable information bearing member of substantially low and uniform birefringence, comprising the steps of:
   (i) processing a clear polymethylmethacrylate plastic to a melt flow rate of about 20 to about 23 grams per 10 minutes;
   (ii) thoroughly drying the plastic;
   (iii) putting the dried plastic into an injection molding machine wherein the temperature of the melt is maintained between about 510° F. and about 560° F.

8. A process is recited in claim 7 wherein the plastic is dried for about 24 hours to about 48 hours.

9. A process as recited in claim 7 wherein the temperature of the melt is maintained at about 560° F. and the molding time is about 0.5 second.

10. A process as recited in claim 7 wherein the plastic contains substantially no foreign particles.

11. A process as recited in claim 7 wherein the plastic contains foreign particles with a size range between about 1 micron and about 10 microns.

12. A process as recited in claim 7 wherein the plastic contains from about 0.5% to about 0.8% by weight lubricant, and wherein the lubricant has a vaporization temperature above the heating temperature.

13. A process as recited in claim 7 wherein the plastic contains substantially no monomers.

* * * * *